(12) United States Patent
Choi et al.

(10) Patent No.: US 9,806,329 B2
(45) Date of Patent: Oct. 31, 2017

(54) NEGATIVE ELECTRODE FOR RECHARGEABLE LITHIUM BATTERY, METHOD OF MANUFACTURING SAME, AND RECHARGEABLE LITHIUM BATTERY INCLUDING SAME

(71) Applicant: Samsung SDI Co., Ltd., Yongin-si, Gyeonggi-do (KR)

(72) Inventors: Young-Jin Choi, Yongin-si (KR);
Yong-Chan You, Yongin-si (KR);
Sang-Hyuck Ahn, Yongin-si (KR);
Su-Kyung Lee, Yongin-si (KR);
Deok-Hyun Kim, Yongin-si (KR);
Xianhui Meng, Yongin-si (KR);
Sang-Pil Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 63 days.

(21) Appl. No.: 15/065,302

(22) Filed: Mar. 9, 2016

(65) Prior Publication Data
US 2016/0268591 A1    Sep. 15, 2016

(30) Foreign Application Priority Data
Mar. 13, 2015 (KR) ........................ 10-2015-0035253

(51) Int. Cl.
*H01M 4/133* (2010.01)
*H01M 4/04* (2006.01)
(Continued)

(52) U.S. Cl.
CPC ......... *H01M 4/133* (2013.01); *H01M 4/0404* (2013.01); *H01M 4/134* (2013.01);
(Continued)

(58) Field of Classification Search
CPC .... H01M 4/133; H01M 4/587; H01M 4/1393; H01M 4/386; H01M 4/364;
(Continued)

(56) References Cited

U.S. PATENT DOCUMENTS

2010/0176337 A1*  7/2010  Zhamu ................ H01M 4/1391
                                                     252/182.1
2010/0323241 A1* 12/2010  Kawakami ............ H01M 4/134
                                                       429/207
(Continued)

FOREIGN PATENT DOCUMENTS

JP     2007-165061 A     6/2007
JP     2013-200984 A    10/2013
KR   10-2013-0106687 A   9/2013

*Primary Examiner* — Stewart Fraser
(74) *Attorney, Agent, or Firm* — Knobbe Martens Olson & Bear LLP

(57) ABSTRACT

Disclosed are a negative electrode for a rechargeable lithium battery that includes a plurality of non-sheet-shaped graphite particles, at least one silicon-based particle in a void formed by assembling the non-sheet-shaped graphite particles, and a sheet-shaped graphite powder between the non-sheet-shaped graphite particles, the void, or both thereof, wherein a size of the silicon particle is smaller than a length of the longest axis of the sheet-shaped graphite powder.

20 Claims, 7 Drawing Sheets

(51) Int. Cl.
*H01M 4/134* (2010.01)
*H01M 4/1393* (2010.01)
*H01M 4/1395* (2010.01)
*H01M 4/36* (2006.01)
*H01M 4/38* (2006.01)
*H01M 4/587* (2010.01)
*H01M 4/62* (2006.01)
*H01M 10/052* (2010.01)

(52) U.S. Cl.
CPC ....... *H01M 4/1393* (2013.01); *H01M 4/1395* (2013.01); *H01M 4/364* (2013.01); *H01M 4/386* (2013.01); *H01M 4/587* (2013.01); *H01M 4/621* (2013.01); *H01M 10/052* (2013.01)

(58) Field of Classification Search
CPC .. H01M 4/1395; H01M 4/0404; H01M 4/134; H01M 4/621; H01M 10/052
See application file for complete search history.

(56) References Cited

U.S. PATENT DOCUMENTS

| | | | |
|---|---|---|---|
| 2013/0252110 A1* | 9/2013 | Park | H01M 4/13 429/231.8 |
| 2014/0234722 A1* | 8/2014 | Kyotani | B82Y 30/00 429/231.8 |
| 2015/0295227 A1* | 10/2015 | Zhao | H01M 4/134 429/303 |

* cited by examiner

NEGATIVE ELECTRODE FOR RECHARGEABLE LITHIUM BATTERY, METHOD OF MANUFACTURING SAME, AND RECHARGEABLE LITHIUM BATTERY INCLUDING SAME

RELATED APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2015-0035253 filed in the Korean Intellectual Property Office on Mar. 13, 2015, the disclosure of which is incorporated herein by reference in its entirety.

BACKGROUND

Field

This disclosure relates to a negative electrode for a rechargeable lithium battery, a method of manufacturing the same, and a rechargeable lithium battery including the same are disclosed.

Description of the Related Technology

A rechargeable lithium battery has recently drawn attention as a power source for small portable electronic devices. Rechargeable lithium batteries include an organic electrolyte solution and thereby, may have twice or more as high discharge voltage as a related art battery using an alkali aqueous solution. Accordingly, lithium batteries have a high energy density.

A lithium-transition metal oxide having a structure being capable of intercalating lithium ions, such as $LiCoO_2$, $LiMn_2O_4$, and $LiNi_{1-x}Co_xO_2$ (0<x<1) may be used as positive active materials of a rechargeable lithium battery.

Various carbon-based negative active materials such as artificial graphite, natural graphite, and hard carbon, which may all intercalate and deintercalate lithium, and a Si-based material have been used as negative active materials of a rechargeable lithium battery.

Si-based negative active material has higher capacity than the carbon-based negative active material, but swelling and extraction during charge and discharge, reduces cycle-life and safety of a battery including Si-based negative active material.

Accordingly, technology for controlling volume swelling of the Si-based negative active material is of interest.

SUMMARY

One embodiment provides a negative electrode for a rechargeable lithium battery being capable of improving cycle-life characteristics and safety of a rechargeable lithium battery.

Another embodiment provides a method of manufacturing the negative electrode.

Yet another embodiment provides a rechargeable lithium battery including the negative electrode.

Some embodiments provide a negative electrode for a rechargeable lithium battery including a plurality of non-sheet-shaped graphite particles, a silicon-based particle in a void formed by assembling the non-sheet-shaped graphite particles, and a sheet-shaped graphite powder between the non-sheet-shaped graphite particles, the void, or both thereof, wherein a size of the silicon particle is smaller than a length of the longest axis of the sheet-shaped graphite powder.

Some embodiments provide a negative electrode for a rechargeable lithium battery including an assembly of non-sheet-shaped graphite particles, at least one silicon-based particle in a region formed between the non-sheet-shaped graphite particles and at least one sheet-shaped graphite powder particle between the non-sheet-shaped graphite particles contacting at least one non-sheet-shaped graphite particle and at least one silicon-based particle, wherein a size of the at least one silicon particle is smaller than a length of the longest axis of the at least one sheet-shaped graphite powder particle. In some embodiments, the region is a void.

In some embodiments, the non-sheet-shaped graphite particle may include spherical graphite, pseudo-spherical graphite, or a mixture thereof.

In some embodiments, the non-sheet-shaped graphite particle may include about 10 wt % to about 40 wt % of natural graphite and about 60 wt % to about 90 wt % of artificial graphite.

In some embodiments, the silicon-based particle may be selected from Si, $SiO_x$ (0<x<2), a Si-M alloy (wherein, M is an alkali metal, an alkaline-earth metal, a Group 13 element, a Group 14 element, a transition metal, a rare earth element, or a combination thereof, and not Si), a composite of Si and carbon, and a combination thereof.

In some embodiments, the non-sheet-shaped graphite particle may have a particle size (D50) of about 10 μm to about 35 μm. In some embodiments, the non-sheet-shaped graphite particle may have a particle size (D50) of about 20 μm to about 35 μm. In some embodiments, the non-sheet-shaped graphite particle may have a particle size (D50) of about 23 μm to about 30 μm.

In some embodiments, the silicon-based particle may have a particle size (D50) of about 1 μm to about 5 μm. In some embodiments, the silicon-based particle may have a particle size (D50) of about 2 μm to about 4 μm.

In some embodiments, a ratio (A/B) of the length (A) of the longest axis of the sheet-shaped graphite powder and a particle size (B) of the silicon-based particle may be greater than about 1 and less than or equal to about 4. In some embodiments, a ratio (A/B) of the length (A) of the longest axis of the sheet-shaped graphite powder and a particle size (B) of the silicon-based particle may be about 1.2 to about 3.5.

In some embodiments, the sheet-shaped graphite powder may have an average length of the longest axis of about 3 μm to about 7 μm. In some embodiments, the sheet-shaped graphite powder may have an average length of the longest axis of about 4 μm to about 6 μm.

In some embodiments, a thickness of the sheet-shaped graphite powder may be greater than about 100 nm and less than or equal to about 900 nm. In some embodiments, a thickness of the sheet-shaped graphite powder may be about 200 nm to about 800 nm. In some embodiments, a thickness of the sheet-shaped graphite powder may be about 100 nm to about 600 nm. In some embodiments, a thickness of the sheet-shaped graphite powder may be about 100 nm to about 400 nm. In some embodiments, a thickness of the sheet-shaped graphite powder may be about 100 nm to about 300 nm. In some embodiments, a thickness of the sheet-shaped graphite powder may be about 200 nm to about 600 nm. In some embodiments, a thickness of the sheet-shaped graphite powder may be about 200 nm to about 400 nm. In some embodiments, a thickness of the sheet-shaped graphite powder may be about 200 nm to about 300 nm. In some embodiments, a thickness of the sheet-shaped graphite powder may be about 300 nm to about 600 nm. In some embodiments, a thickness of the sheet-shaped graphite powder may be about 400 nm to about 600 nm. In some embodiments, a thickness of the sheet-shaped graphite powder may be about 500 nm to about 600 nm. In some embodiments, a thickness of the sheet-shaped graphite powder may be about 300 nm to about 400 nm.

In some embodiments, a ratio of (L/D) of a length (L) of the longest axis and a thickness (D) of the sheet-shaped graphite powder may be about 4 to about 70. In some embodiments, a ratio of (L/D) of a length (L) of the longest axis and a thickness (D) of the sheet-shaped graphite powder may be about 10 to about 60. In some embodiments, a ratio of (L/D) of a length (L) of the longest axis and a thickness (D) of the sheet-shaped graphite powder may be about 10 to about 50. In some embodiments, a ratio of (L/D) of a length (L) of the longest axis and a thickness (D) of the sheet-shaped graphite powder may be about 10 to about 40. In some embodiments, a ratio of (L/D) of a length (L) of the longest axis and a thickness (D) of the sheet-shaped graphite powder may be about 10 to about 30. In some embodiments, a ratio of (L/D) of a length (L) of the longest axis and a thickness (D) of the sheet-shaped graphite powder may be about 10 to about 20. In some embodiments, a ratio of (L/D) of a length (L) of the longest axis and a thickness (D) of the sheet-shaped graphite powder may be about 15 to about 60. In some embodiments, a ratio of (L/D) of a length (L) of the longest axis and a thickness (D) of the sheet-shaped graphite powder may be about 25 to about 60. In some embodiments, a ratio of (L/D) of a length (L) of the longest axis and a thickness (D) of the sheet-shaped graphite powder may be about 35 to about 60. In some embodiments, a ratio of (L/D) of a length (L) of the longest axis and a thickness (D) of the sheet-shaped graphite powder may be about 45 to about 60.

In some embodiments, an amount of the non-sheet-shaped graphite particle may be about 50 wt % to about 90 wt % based on the total weight, 100 wt % of the negative active material layer. In some embodiments, an amount of the non-sheet-shaped graphite particle may be about 70 wt % to about 90 wt % based on the total weight, 100 wt % of the negative active material layer.

In some embodiments, an amount of the silicon-based particle may be about 5 to about 50 wt % based on the total weight, 100 wt % of the negative active material layer. In some embodiments, an amount of the silicon-based particle may be about 10 to about 30 wt % based on the total weight, 100 wt % of the negative active material layer. In some embodiments, an amount of the silicon-based particle may be about 20 to about 30 wt % based on the total weight, 100 wt % of the negative active material layer. In some embodiments, an amount of the silicon-based particle may be about 30 to about 40 wt % based on the total weight, 100 wt % of the negative active material layer. In some embodiments, an amount of the silicon-based particle may be about 40 to about 50 wt % based on the total weight, 100 wt % of the negative active material layer.

In some embodiments, an amount of the sheet-shaped graphite powder may be about 2 to about 15 wt % based on the total weight, 100 wt % of the negative active material layer. In some embodiments, an amount of the sheet-shaped graphite powder may be about 2 to about 10 wt % based on the total weight, 100 wt % of the negative active material layer. In some embodiments, an amount of the sheet-shaped graphite powder may be about 5 to about 15 wt % based on the total weight, 100 wt % of the negative active material layer. In some embodiments, an amount of the sheet-shaped graphite powder may be about 5 to about 10 wt % based on the total weight, 100 wt % of the negative active material layer.

In some embodiments, the negative electrode may further include an aqueous binder, and the aqueous binder may include a styrene-butadiene rubber (SBR), a carboxyl methyl cellulose (CMC), an acrylonitrile-butadiene rubber, an acryl-based resin, a hydroxyethyl cellulose, or a combination thereof.

Some embodiments provide a method of manufacturing a negative electrode for a rechargeable lithium battery including adding non-sheet-shaped graphite particle, silicon-based particle, and a sheet-shaped graphite powder to an aqueous binder solution to prepare a composition (wherein a size of the silicon particle is smaller than the length of the longest axis of the sheet-shaped graphite powder), and applying the composition on a current collector followed by drying and compressing the same to manufacture a negative electrode.

Some embodiments provide a method of manufacturing a negative electrode for a rechargeable lithium battery including adding at least one non-sheet-shaped graphite particle, at least one silicon-based particle, and a sheet-shaped graphite powder to an aqueous binder solution to prepare a composition, wherein a size of the at least one silicon particle is smaller than the length of the longest axis of the sheet-shaped graphite powder, and applying the composition on a current collector followed by drying and compressing the same to manufacture a negative electrode.

Some embodiments provide a rechargeable lithium battery includes the negative electrode, a positive electrode, and an electrolyte.

Other embodiments are included in the following detailed description.

In some embodiments, a rechargeable lithium battery having improved cycle life characteristics and safety of a rechargeable lithium battery may be realized by controlling volume swelling of the negative electrode.

DETAILED DESCRIPTION

Hereinafter, embodiments are described in detail. However, these embodiments are exemplary, and this disclosure is not limited thereto.

A negative electrode for a rechargeable lithium battery according to one embodiment includes a plurality of non-sheet-shaped graphite particles, a silicon-based particle in a void formed by assembling the non-sheet-shaped graphite particles, and a sheet-shaped graphite powder between the non-sheet-shaped graphite particles, the void, or both thereof, wherein a size of the silicon particle is smaller than a length of the longest axis of the sheet-shaped graphite powder.

Figure 1:
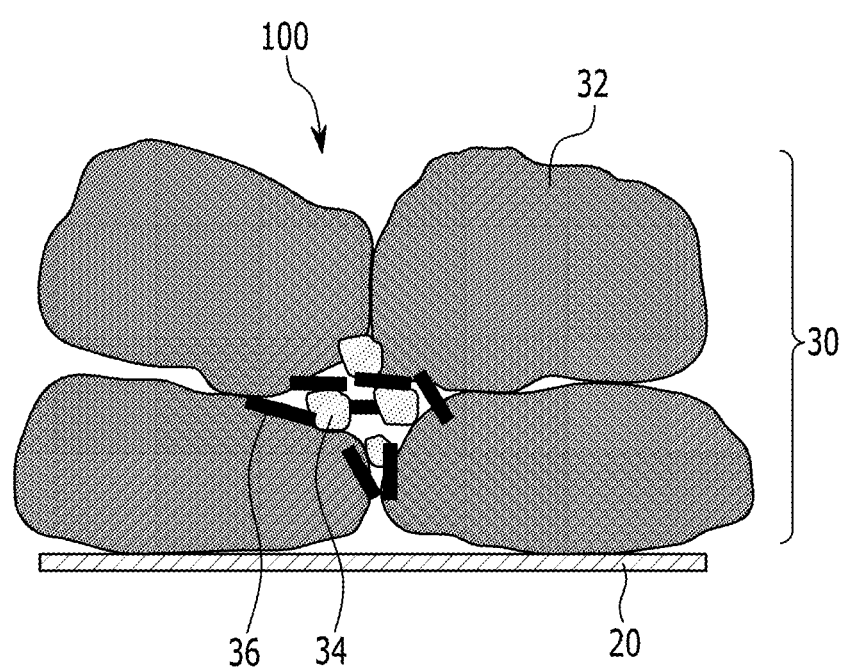
FIG. 1 is sectional view of a negative electrode according to one embodiment.

Hereinafter, referring to FIG. 1, a negative electrode for a rechargeable lithium battery according to one embodiment is described. FIG. 1 is a cross-sectional view of negative electrode for a rechargeable lithium battery according to one embodiment.

Referring to FIG. 1, a negative electrode 100 according to one embodiment includes a negative active material layer 30 on a current collector 20.

In some embodiments, the current collector 20 may include a copper foil, a nickel foil, a stainless steel foil, a titanium foil, a nickel foam, a copper foam, a polymer substrate coated with a conductive metal, or a combination thereof.

In some embodiments, the negative active material layer 30 includes a plurality of non-sheet-shaped graphite particles 32, silicon-based particles 34 the non-sheet-shaped graphite particle 34 in a region formed by assembling the non-sheet-shaped graphite particles, and a sheet-shaped graphite powder 36 between the non-sheet-shaped graphite particles 32, the region, or both thereof. In some embodiments, the region is a void. In some embodiments, the silicon particle 34 may be led to a predetermined position by the sheet-shaped graphite powder 36 when the silicon particle 34 has a smaller size than the length of the longest axis of the sheet-shaped graphite powder 36. In some embodiments, the size of the silicon particle 34 indicates a diameter when the silicon particle 34 is a spherical shape particle and the length of the longest axis when the silicon particle 34 is a pseudo-spherical shape particle.

In some embodiments, the void is an empty space formed by three or more non-sheet-shaped graphite particles 32. In some embodiments, the silicon-based particles 34 are led to be predominantly present in the empty space by the sheet-shaped graphite powder 36 having a longer length of the longest axis than the size of the silicon particle 34. In some embodiments, the empty space may provide a buffer space when the volume of the silicon-based particle 34 is sharply increased during the charge and discharge. In some embodiments, the sheet-shaped graphite powder 36 may be present among the non-sheet-shaped graphite particles 32 and in the void and thus, may play a role of a lubricant helping the silicon-based particle 34 positioned in the void.

In some embodiments, the silicon-based particle 34 is not predominantly present in the void but mainly present in a gap among the non-sheet-shaped graphite particles 32 when the sheet-shaped graphite powder 36 is not used.

In some embodiments, the negative electrode has the structure shown in FIG. 1 and thus, effectively controls the expansion ratio of the silicon-based particle 34 during the charge and discharge and thus, may suppress deformation of a battery due to expansion of the battery and improve cycle-life characteristics of the battery.

In some embodiments, the non-sheet-shaped graphite particle 32 may include spherical graphite, pseudo-spherical graphite, or a mixture thereof. In some embodiments, the non-sheet-shaped graphite particle 32 may include about 10 wt % to about 40 wt % of natural graphite and about 60 wt % to about 90 wt % of artificial graphite.

In some embodiments, the non-sheet-shaped graphite particle 32 may have a particle size (D50) of about 10 μm to about 35 μm, for example about 20 μm to about 35 μm, for another example about 23 μm to about 30 μm. In some embodiments, a void may have so sufficient size as to position the silicon-based particle 34 and the sheet-shaped graphite powder 36 when the non-sheet-shaped graphite particle 32 has a particle size within the range, easily providing the structure of a negative electrode shown in FIG. 1.

Herein, D50 indicates a particle diameter corresponding to an integrating value of about 50% in the distribution of the particle size and is called to be a median diameter. Hereinafter, the D50 is the same as described above.

In some embodiments, the particle size indicates a diameter when the non-sheet-shaped graphite particle 32 is spherical graphite but the longest length of the longest axis when the non-sheet-shaped graphite particle 32 is pseudo-spherical graphite.

In some embodiments, the silicon-based particle 34 may be selected from Si, $SiO_x$ (0<x<2), Si-M alloy (wherein, the M is an alkali metal, an alkaline-earth metal, a Group 13 element, a Group 14 element, a Group 15 element, a Group 16 element, a transition metal, a rare earth element or a combination thereof, and not Si), a composite of Si and carbon, and a combination thereof. The element M may be selected from Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po, and a combination thereof. In some embodiments, the silicon-based particle 34 may be amorphous or crystalline.

In some embodiments, the silicon-based particle 34 may have a particle size (D50) of about 1 μm to about 5 μm, for example about 2 μm to about 4 μm. The silicon-based particle 34 having the particle size may be effectively positioned in the void and thus, easily provide the negative electrode structure shown in FIG. 1.

In some embodiments, a ratio (A/B) of the length (A) of the longest axis of the sheet-shaped graphite powder and a particle size (B) of the silicon-based particle may be greater than about 1 and less than or equal to about 4, for example about 1.2 to about 3.5, for another example about 1.5 to about 3. In some embodiments, the sheet-shaped graphite powder 36 may lead the silicon-based particle 34 into the void when the particle size ratio is within the range and thus, may easily provide the negative electrode structure shown in FIG. 1.

In some embodiments, the sheet-shaped graphite powder may have an average length of the longest axis of about 3 μm to about 7 μm, for example about 4 μm to about 6 μm, for another example about 5 μm to about 6 μm. In some embodiments, the sheet-shaped graphite powder 36 may be set to have a larger size than that of the silicon-based particle 34 and lead the silicon-based particle 34 into the void when the sheet-shaped graphite powder 36 has an average length of the longest axis within the range and thus, easily control the volume expansion of an electrode and easily provide the negative electrode structure shown in FIG. 1.

In some embodiments, a thickness of the sheet-shaped graphite powder 36 may be greater than about 100 nm and less than or equal to about 900 nm, for example about 200 nm to about 800 nm. In some embodiments, a ratio of (L/D) of a length (L) of the longest axis and a thickness (D) of the sheet-shaped graphite powder may be about 4 to about 70, for example about 10 to about 60, for another example about 10 to about 40. In some embodiments, the sheet-shaped graphite powder 36 may lead the silicon-based particle 34 to be positioned in the void when the sheet-shaped graphite powder 36 has a thickness and a L/D ratio within the ranges and thus, may easily control the volume expansion of an electrode and easily provide the negative electrode structure shown in FIG. 1.

In some embodiments, the sheet-shaped graphite powder 36 may have a shape such as a plate, a sheet, a fiber, a rod, and a tube.

In some embodiments, an amount of the non-sheet-shaped graphite particle 32 may be about 50 wt % to about 90 wt %, for example about 70 wt % to about 90 wt % based on the total weight, 100 wt % of the negative active material layer. In some embodiments, the, the void may be formed as many as necessary when the non-sheet-shaped graphite particle 34 is used within the range.

In some embodiments, an amount of the silicon-based particle 34 may be about 5 wt % to about 50 wt %, for example about 10 wt % to about 30 wt % based on the total weight, 100 wt % of the negative active material layer. In some embodiments, capacity and safety of a battery may be improved when the silicon-based particle 34 is used within the range.

In some embodiments, an amount of the sheet-shaped graphite powder 36 may be about 2 wt % to about 15 wt %, for example about 2 wt % to about 10 wt % based on the total weight, 100 wt % of the negative active material layer. In some embodiments, the silicon-based particle 34 may be led to be positioned in the void and thus, easily control the volume expansion of an electrode when the sheet-shaped graphite powder 36 is used within the range.

In some embodiments, the negative electrode 100 may further include an aqueous binder, and the aqueous binder may include a styrene-butadiene rubber (SBR), a carboxylmethyl cellulose (CMC), an acrylonitrile-butadiene rubber, an acryl-based resin, a hydroxyethyl cellulose, or a combination thereof.

In some embodiments, an amount of the aqueous binder may be about 1 wt % to about 30 wt %, for example about 1 wt % to about 2 wt % based on the total amount of the negative active material layer 30. Within the ranges of the aqueous binder, capacity and cycle life of a battery may be improved.

Some embodiments provide a method of manufacturing a negative electrode for a rechargeable lithium battery including adding a non-sheet-shaped graphite particle, a silicon-based particle, and a sheet-shaped graphite powder to an aqueous binder solution to prepare a composition, and applying the composition on a current collector followed by drying and compressing the same. In some embodiments, a size of the silicon particle may be smaller than the length of the longest axis of the sheet-shaped graphite powder.

In some embodiments, the method of manufacturing the negative electrode uses an aqueous binder and water as a solvent and thus, may be environment-friendly and simplify a process.

In some embodiments, the negative electrode manufactured according to the manufacturing method may have the structure shown in FIG. 1. In some embodiments, the non-sheet-shaped graphite particle, the silicon-based particle and the sheet-shaped graphite powder are the same as described in the negative electrode shown in FIG. 1.

Some embodiments provide a rechargeable lithium battery including the negative electrode, a positive electrode, and an electrolyte.

A rechargeable lithium battery can be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shape. In addition, it can be bulk type and thin film type depending on size. Structures and manufacturing methods for lithium ion batteries pertaining to this disclosure are well known in the art.

Figure 2:
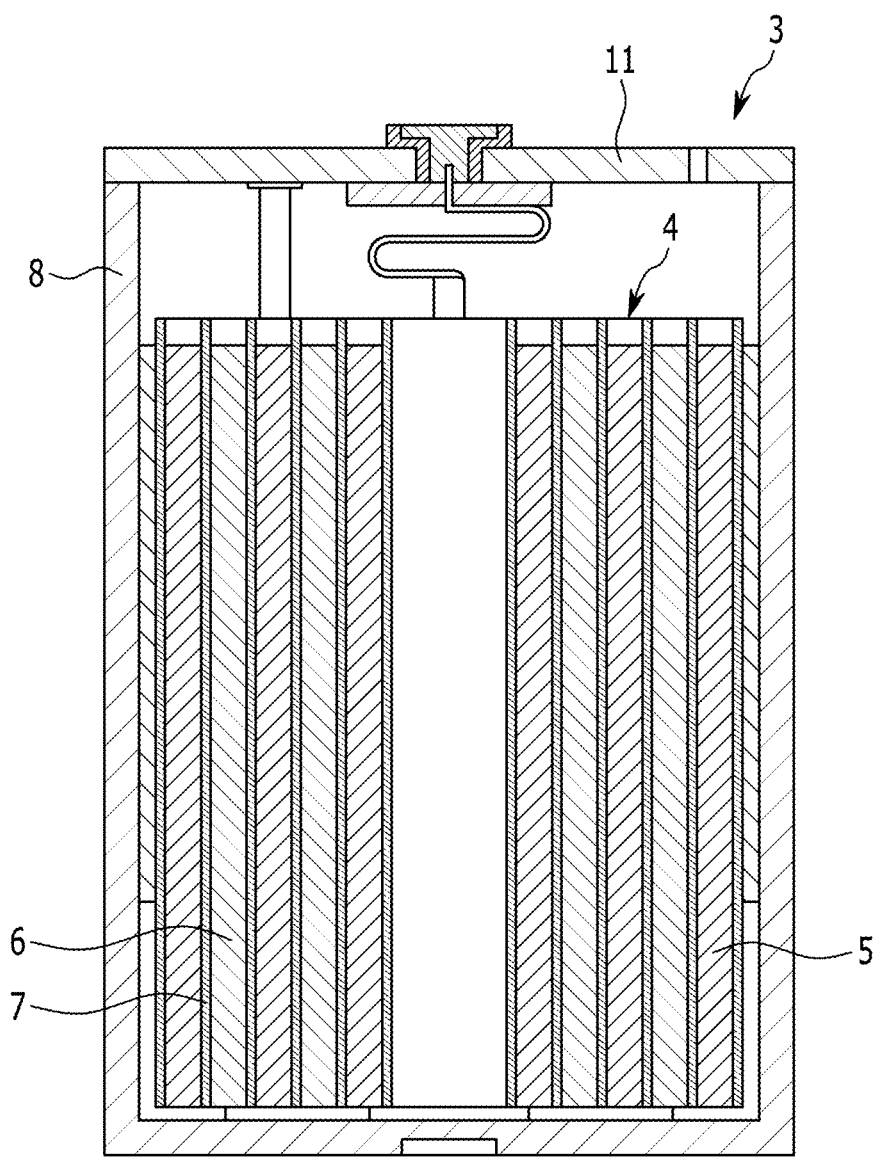
FIG. 2 is a schematic view showing a rechargeable lithium battery according to one embodiment.

A rechargeable lithium battery according to one embodiment is described referring to FIG. 2. FIG. 2 is a schematic view of a rechargeable lithium battery according to one embodiment.

Referring to FIG. 2, a rechargeable lithium battery 3 according to one embodiment is a prismatic type battery that includes an electrode assembly 4 including a positive electrode 5, a negative electrode 6, and a separator 7 disposed between the positive electrode 5 and negative electrode 6 in a battery case 8, an electrolyte solution injected through the upper side of the battery case 8, and a cap plate 11 sealing the battery case 8. The rechargeable lithium battery according to one embodiment of the present disclosure is not limited to a prismatic type of rechargeable lithium battery, and it may be formed in diverse forms such as a cylindrical form, a coin-type form, or a pouch form.

In some embodiments, the positive electrode may include a positive current collector and a positive active material layer formed on the positive current collector.

In some embodiments, the positive active material may include lithiated intercalation compounds that reversibly intercalate and deintercalate lithium ions. Specifically, at least one composite oxide of lithium and a metal of cobalt, manganese, nickel, or a combination thereof may be used, and specific examples thereof may be a compound represented by one of the following chemical formulae:

$Li_aA_{1-b}R_bD^1{}_2$ (0.90≤a≤1.8 and 0≤b≤0.5);
$Li_aE_{1-b}R_bO_{2-c}D^1{}_c$ (0.90≤a≤1.8, 0≤b≤0.5 and 0≤c≤0.05);
$Li_aE_{2-b}R_bO_{4-c}D^1{}_c$ (0.90≤a≤1.8, 0≤b≤0.5, 0≤c≤0.05);
$Li_aNi_{1-b-c}Co_bR_cD^1{}_\alpha$ (0.90≤a≤1.8, 0≤b≤0.5, 0≤c≤0.05 and 0<α<2);
$Li_aNi_{1-b-c}Co_bR_cO_{2-\alpha}Z_\alpha$ (0.90≤a≤1.8, 0≤b≤0.5, 0≤c≤0.05 and 0<α<2);
$Li_aNi_{1-b-c}Co_bR_cO_{2-\alpha}Z_2$ (0.90≤a≤1.8, 0≤b≤0.5, 0≤c≤0.05 and 0<α<2);
$Li_aNi_{1-b-c}Mn_bR_cD_\alpha$ (0.90≤a≤1.8, 0≤b≤0.5, 0≤c≤0.05 and 0≤α≤2);
$Li_aNi_{1-b-c}Mn_bR_cO_{2-\alpha}Z_\alpha$ (0.90≤a≤1.8, 0≤b≤0.5, 0≤c≤0.05 and 0<α<2);
$Li_aNi_{1-b-c}Mn_bR_cO_{2-\alpha}Z_2$ (0.90≤a≤1.8, 0≤b≤0.5, 0≤c≤0.05 and 0<α<2);
$Li_aNi_bE_cG_dO_2$ (0.90≤a≤1.8, 0≤b≤0.9, 0≤c≤0.5 and 0.001≤d≤0.1);
$Li_aNi_bCo_cMn_dGeO_2$ (0.90≤a≤1.8, 0≤b≤0.9, 0≤c≤0.5, 0≤d≤0.5 and 0.001≤e≤0.1);
$Li_aNiG_bO_2$ (0.90≤a≤1.8 and 0.001≤b≤0.1); $Li_aCoG_bO_2$ (0.90≤a≤1.8 and 0.001≤b≤0.1);
$Li_aMnG_bO_2$ (0.90≤a≤1.8 and 0.001≤b≤0.1); $Li_aMn_2G_bO_4$ (0.90≤a≤1.8 and 0.001≤b≤0.1);
$QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2);
$Li_{(3-f)}Fe_2(PO_4)_3$ (0≤f≤2); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; $D^1$ is O (oxygen), F (fluorine), S (sulfur), P (phosphorus), or a combination thereof; E is Co, Mn, or a combination thereof; Z is F (fluorine), S (sulfur), P (phosphorus), or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

In some embodiments, the positive active material may include the positive active material with the coating layer, or a compound of the active material and the active material coated with the coating layer. In some embodiments, the coating layer may include a coating element compound of an oxide of a coating element, hydroxide of a coating element, oxyhydroxide of a coating element, oxycarbonate of a coating element, or hydroxycarbonate of a coating element. In some embodiments, the compound for the coating layer may be either amorphous or crystalline. In some embodiments, the coating element included in the coating layer may be Mg, Al, Co, K, Na, Ca, Si, Ti, V, Sn, Ge, Ga, B (boron), As, Zr, or a mixture thereof. The coating process may include any conventional processes as long as it does not causes any side effects on the properties of the positive active material (e.g., spray coating, immersing), which is well known to persons having ordinary skill in this art, so a detailed description thereof is omitted.

In some embodiments, the positive active material layer may include a binder and a conductive material.

The binder improves binding properties of positive active material particles with one another and with a current collector. Examples thereof may be polyvinyl alcohol, carboxylmethyl cellulose, hydroxypropyl cellulose, diacetyl cellulose, polyvinylchloride, carboxylated polyvinyl chloride, polyvinyl fluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of an electrode. Any electrically conductive material may be used as a conductive material, unless it causes a chemical change. Examples thereof may be one or more of natural graphite, artificial graphite, carbon black, acetylene black, ketjen black, a carbon fiber, a metal powder, a metal fiber, and the like of copper, nickel, aluminum, silver, and the like, a conductive material such as a polyphenylene derivative.

The current collector may include Al, but is not limited thereto.

The positive electrode may be manufactured by mixing an active material, a conductive material, and a binder in a solvent to prepare an active material composition, and coating the composition on a current collector. The electrode manufacturing method is well known, and thus is not described in detail in the present specification. The solvent includes N-methylpyrrolidone and the like, but is not limited thereto.

The electrolyte includes a non-aqueous organic solvent and a lithium salt.

The non-aqueous organic solvent serves as a medium for transmitting ions taking part in the electrochemical reaction of a battery.

In some embodiments, the non-aqueous organic solvent may include a carbonate-based, ester-based, ether-based, ketone-based, alcohol-based, or aprotic solvent. In some embodiments, the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may include methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. In some embodiments, the ether-based solvent may include dibutyl ether, tetraglyme, diglyme, dimethoxyethane, 2-methyltetrahydrofuran, tetrahydrofuran, and the like, and the ketone-based solvent may include cyclohexanone, and the like. In some embodiments, the alcohol-based solvent may include ethanol, isopropyl alcohol, and the like, and the aprotic solvent may include nitriles such as R—CN (R is a hydrocarbon group having a C2 to C20 linear, branched, or cyclic structure, and may include a double bond, an aromatic ring, or an ether bond) and the like, amides such as dimethylformamide and the like, dioxolanes such as 1,3-dioxolane, sulfolanes, and the like.

The non-aqueous organic solvent may be used singularly or in a mixture. When the organic solvent is used in a mixture, the mixture ratio may be controlled in accordance with a desirable battery performance.

In some embodiments, the carbonate-based solvent is prepared by mixing a cyclic carbonate and a linear carbonate. In some embodiments, the cyclic carbonate and the linear carbonate are mixed together in the volume ratio of about 1:1 to about 1:9. Within this range, performance of electrolyte may be improved.

In some embodiments, the non-aqueous organic electrolyte may be further prepared by mixing a carbonate-based solvent with an aromatic hydrocarbon-based solvent. In some embodiments, the carbonate-based and the aromatic hydrocarbon-based solvents may be mixed together in a volume ratio ranging from about 1:1 to about 30:1.

In some embodiments, the aromatic hydrocarbon-based organic solvent may be an aromatic hydrocarbon-based compound represented by the following Chemical Formula 1.

[CHEMICAL FORMULA 1]

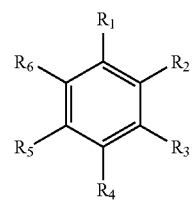

In Chemical Formula 1, $R_1$ to $R_6$ are each independently hydrogen, a halogen, a C1 to C10 alkyl group, a C1 to C10 haloalkyl group, or a combination thereof.

In some embodiments, the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-tri fluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

In order to improve battery cycle-life, the non-aqueous electrolyte may further include vinylene carbonate or an ethylene carbonate-based compound of the following Chemical Formula 2.

[CHEMICAL FORMULA 2]

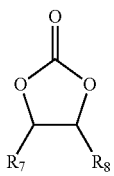

In Chemical Formula 2, $R_7$ and $R_8$ are each independently hydrogen, a halogen, a cyano group (CN), a nitro group ($NO_2$), or a C1 to C5 fluoroalkyl group, wherein at least one of the $R_7$ and $R_8$ is a halogen (—F, —Cl, —Br, or —I), a cyano group (CN), a nitro group ($NO_2$), or a C1 to C5 fluoroalkyl group.

Examples of the ethylene carbonate-based compound are difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used to improve cycle life may be adjusted within an appropriate range.

The lithium salt is dissolved in an organic solvent, supplies lithium ions in a battery, operates a basic operation of the rechargeable lithium battery, and improves lithium ion transportation between positive and negative electrodes therein. Examples of the lithium salt may be $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, e.g., an integer of 1 to 20, LiCl, LiI, $LiB(C_2O_4)_2$ (lithium bis(oxalato) borate) or a combination thereof, which is used as a supporting electrolytic salt. In some embodiments, the lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

The separator may be, for example, selected from a glass fiber, polyester, polyethylene, polypropylene, polytetrafluoroethylene (PTFE), or a combination thereof. It may have a form of a non-woven fabric or a woven fabric. For example, for the lithium ion battery, polyolefin-based polymer separator such as polyethylene, polypropylene or the like is mainly used. In order to ensure the heat resistance or mechanical strength, a coated separator including a ceramic component or a polymer material may be used. Selectively, it may have a mono-layered or multi-layered structure.

The rechargeable lithium battery is appropriately used for an electric vehicle requiring high capacity and high power and driven at a high temperature other than a conventional use such as a mobile phone, and a portable computer and also, combined with a conventional internal combustion engine, fuel cell, super capacitor and the like and used for a hybrid vehicle and the like. In addition, the rechargeable lithium battery may be used for other uses requiring high power and a high voltage and driven at a high temperature.

Hereinafter an examples of the present disclosure and comparative examples are described. These examples, however, should not in any sense be interpreted as limiting the scope of the present invention.

Examples 1 to 4: Manufacture of Negative Electrode 1.5 parts by weight of CMC (carboxymethyl cellulose) was added to 100 parts by weight of a mixture including a non-sheet-shaped graphite particle (artificial graphite and natural graphite of 70:30 wt %) having a particle diameter (D50) of 25 μm, a silicon (Si) particle having a particle diameter (D50) of 3 μm and a sheet-shaped graphite powder having 5 μm of an average length (L) of the longest axis and 250 nm of the thickness (D) (L/D=20) in each amount provided in the following Table 1, and 1.5 parts by weight of a styrene-butadiene rubber (SBR) and pure water were added thereto, preparing slurry having a solid content of 50 wt %.

The slurry was coated on a 8 μm copper foil, dried, and compressed, manufacturing a negative electrode.

Comparative Example 1: Manufacture of Negative Electrode 1.5 parts by weight of CMC (carboxymethyl cellulose) was added to 100 parts by weight of a mixture including a non-sheet-shaped graphite particle having a particle diameter (D50) of 25 μm and a silicon (Si) particle having a particle diameter (D50) of 3 μm in each amount provided in the following Table 1, and 1.5 parts by weight of a styrene-butadiene rubber (SBR) and pure water were added thereto, preparing slurry having a solid content of 50 wt %.

The slurry was coated on a 8 μm copper foil, dried and compressed, affording a negative electrode.

Comparative Example 2: Manufacture of Negative Electrode

A negative electrode was manufactured according to the same method as Example 3 except for using a silicon (Si) particle having a particle diameter (D50) of 6 μm and a sheet-shaped graphite powder having 3 μm of an average length of the longest axis.

TABLE 1

| | Non-sheet-shaped graphite particle (wt %) | Silicon-based particle (wt %) | Sheet-shaped graphite powder (wt %) |
|---|---|---|---|
| Example 1 | 83 | 15 | 2 |
| Example 2 | 80 | 15 | 5 |
| Example 3 | 75 | 15 | 10 |
| Example 4 | 70 | 15 | 15 |
| Comparative Example 1 | 85 | 15 | — |
| Comparative Example 2 | 70 | 15 | 15 |

Cross-Section Morphology of Negative Electrode

Figure 3A:
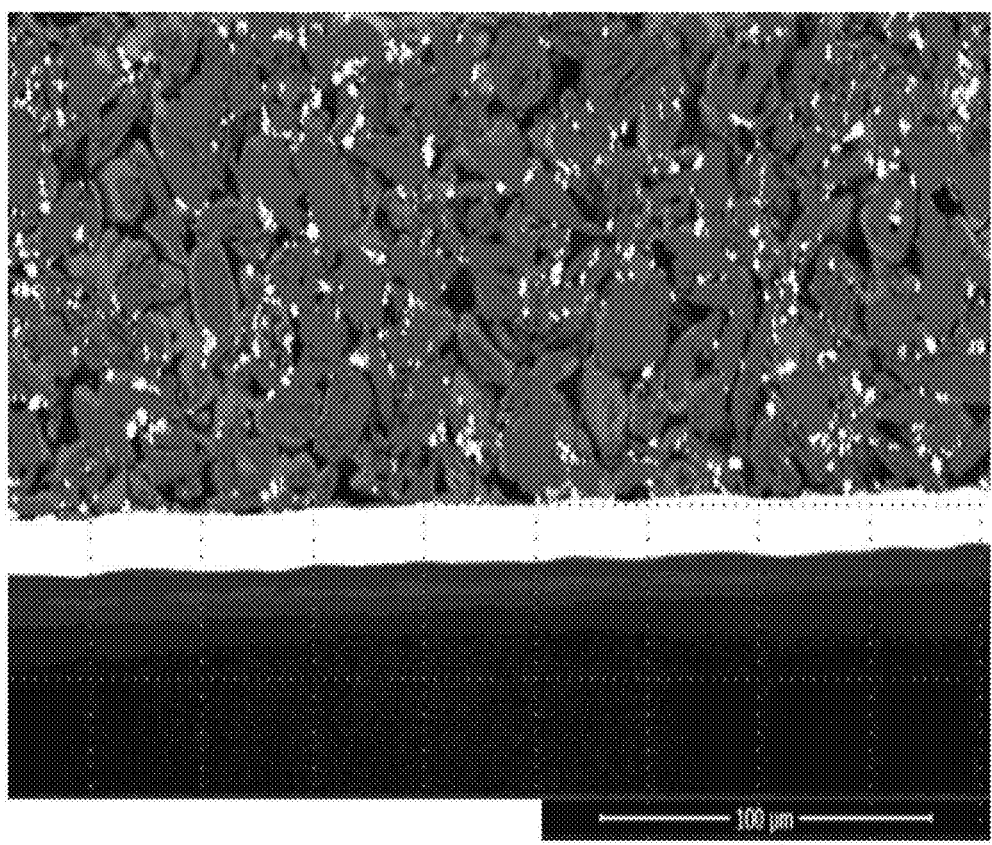
FIG. 3A is a scanning electron microscope (SEM) photograph showing the cross section of a negative electrode according to Comparative Example 1.
Figure 3B:
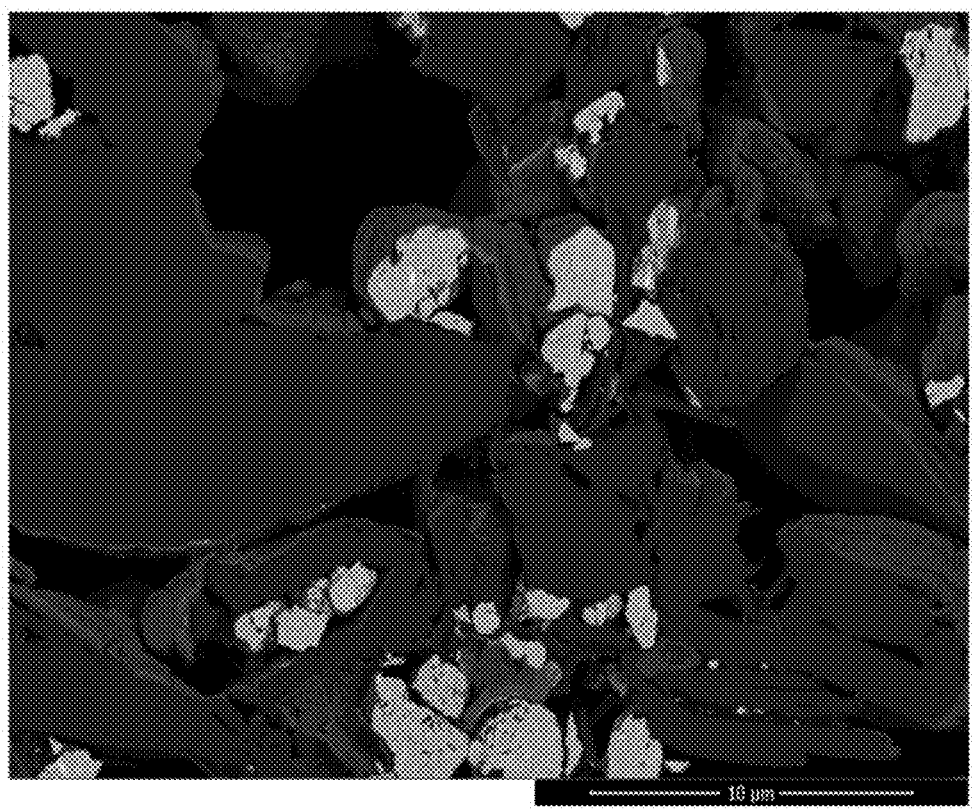
FIG. 3B is a scanning electron microscope (SEM) photograph enlarging the photograph of FIG. 3A.
Figure 4A:
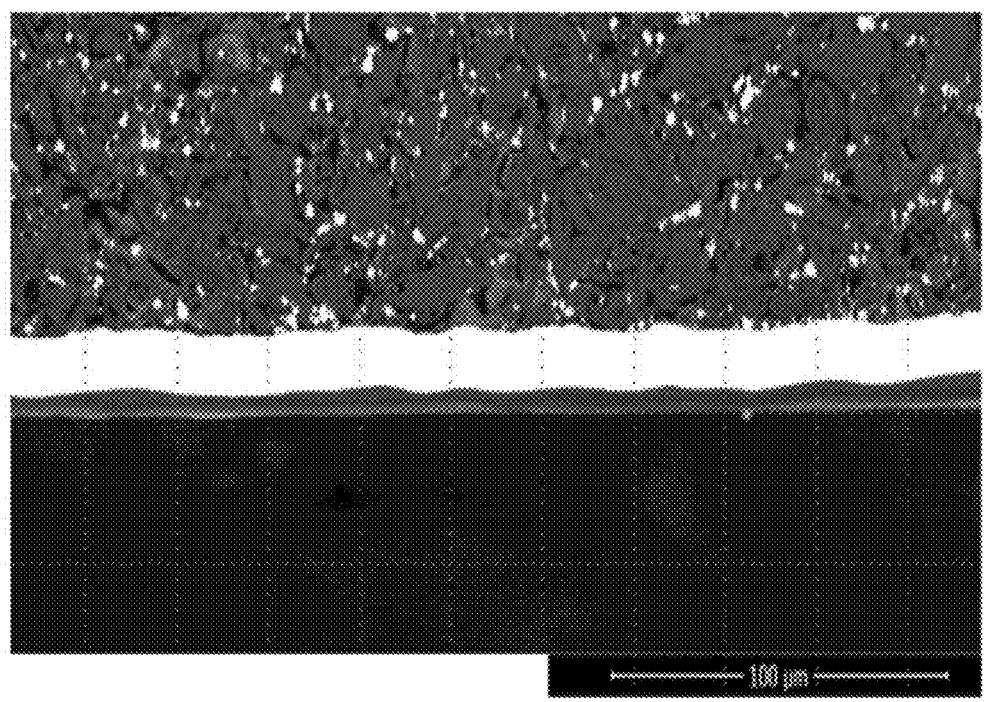
FIG. 4A is a scanning electron microscope (SEM) photograph showing the cross section of a negative electrode according to Example 3.
Figure 4B:
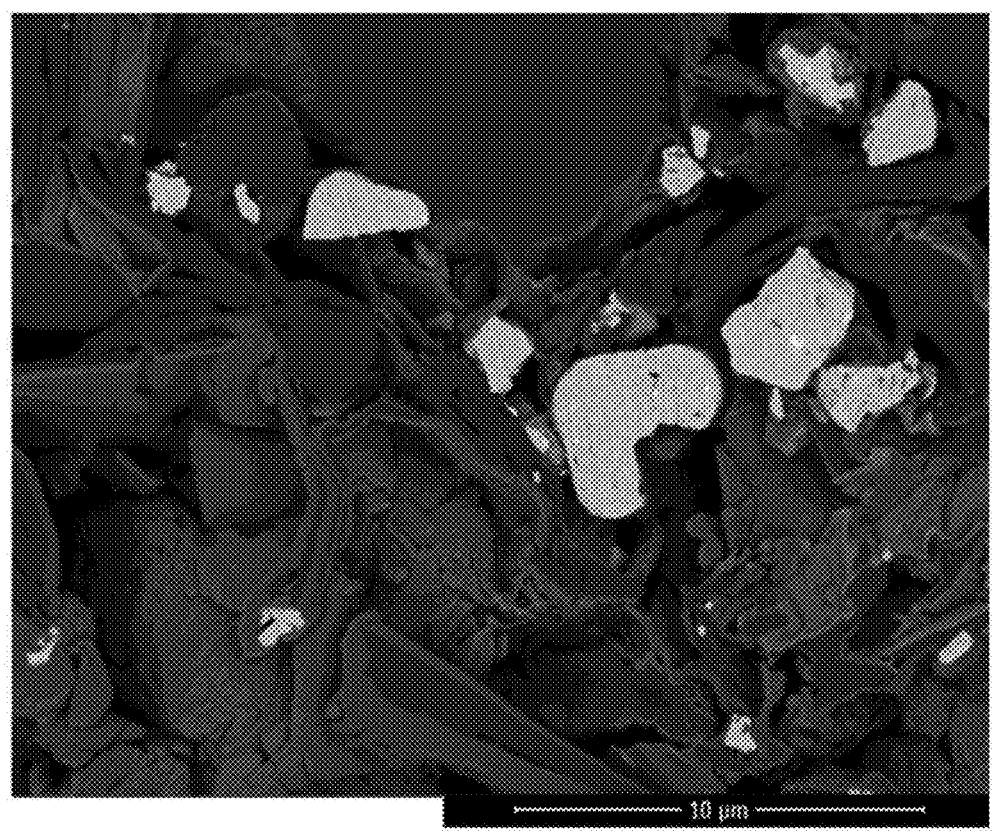
FIG. 4B is a scanning electron microscope (SEM) photograph enlarging the photograph of FIG. 4A.

The cross sections of the negative electrodes according to Example 3 and Comparative Example 1 were compared. FIG. 3A is a scanning electron microscope (SEM) photograph showing the cross-section of the negative electrode according to Comparative Example 1 (Magellan 400L available from FEI Corporate Headquarters, Oreg., USA). FIG. 3B is a scanning electron microscope (SEM) photograph enlarging the photograph of FIG. 3A. In FIG. 3B, the white-colored portions refer to silicon particles, the black-colored portions refer to voids, and the grey-colored portions refer to non-sheet-shaped graphite. FIG. 4A is a scanning electron microscope (SEM) photograph showing the cross-section of the negative electrode according to Comparative Example 1. FIG. 4B is a scanning electron microscope (SEM) photograph enlarging the photograph of FIG. 4A. In FIG. 4B, the white-colored portions refer to silicon particles and the remaining grey-colored portions refer to non-sheet shaped graphite (large size) and sheet-shaped graphite (small size). In FIG. 4B, the voids are not clearly shown.

Referring to FIGS. 3A and 3B, the negative electrode to Comparative Example 1 shows that the silicon particles were irregularly distributed among the non-sheet-shaped graphite particles, voids were slantly formed toward one side, and lots of the voids included no silicon particle.

On the other hand, referring to FIGS. 4A and 4B, the negative electrode according to Example 3 shows that the silicon particles were regularly distributed in voids formed by the non-sheet-shaped graphite particles.

Manufacture of Coin Cell for Test and Evaluation of Swelling Ratio

Each coin cell 2032 was manufactured by respectively using the negative electrodes according to Examples 1 to 4 and Comparative Examples 1 and 2 and a lithium foil as their counter electrodes. Herein, an electrolyte solution was prepared by mixing ethylenecarbonate (EC), ethylmethylcarbonate (EMC) and diethylcarbonate (DEC) (a volume ratio of 3:5:2) and dissolving $LiPF_6$ in a 1.3 M concentration.

The coin cell was charged with a constant current-voltage (constant current, 0.2 C-rate, 0.01 V) and a constant voltage (constant voltage, 0.01 V, 0.01 C cut-off) and discharged with a constant current (constant current, 0.2 C-rate, 0.01 C cut-off, 1.5 V).

Capacity, efficiency and swelling ratio of the coin cells respectively including the negative electrodes according to Examples 1 to 4 and Comparative Examples 1 and 2 were provided in the following Table 2.

The efficiency was calculated according to Equation 1, and the swelling ratio was calculated according to Equation 2.

(Discharge capacity/Charge capacity)×100     [EQUATION 1]

[(Thickness after charge−Initial thickness)/Initial thickness]×100     [EQUATION 2]

TABLE 2

| | Discharge capacity (mAh/g) | Charge capacity (mAh/g) | Efficiency (%) | Swelling ratio (%) |
|---|---|---|---|---|
| Example 1 | 437 | 483 | 90.5 | 41.0 |
| Example 2 | 435 | 481 | 90.4 | 40.4 |
| Example 3 | 436 | 483 | 90.3 | 39.2 |
| Example 4 | 436 | 484 | 90.1 | 38.8 |
| Comparative Example 1 | 437 | 483 | 90.5 | 43.5 |
| Comparative Example 2 | 435 | 481 | 90.4 | 45.5 |

Referring to Table 2, each cell including the negative electrodes using the sheet-shaped graphite powder according to Examples 1 to 4 showed a lower swelling ratio compared with each cell including the negative electrodes according to Comparative Examples 1 and 2.

Manufacture of Full Cell for Test and Evaluation of Cycle Life 1.3 parts by weight of carbon black as a conductive material and 1.25 parts by weight of polyvinylidene fluoride (PVDF) as a binder based on 100 parts by weight of a positive active material obtained by mixing $LiCoO_2$ and $LiNi_{0.6}Co_{0.2}Mn_{0.2}O_2$ in a weight ratio of 80:20 were uniformly dispersed into N-methyl-2-pyrrolidone, preparing slurry. The slurry was coated on a 12 μm aluminum foil and then, dried and compressed, manufacturing a positive electrode.

Each negative electrode according to Examples 1 to 4 and Comparative Examples 1 and 2 and the positive electrode were used to manufacture a pouch full cell having capacity of 100 mAh.

Figure 5:
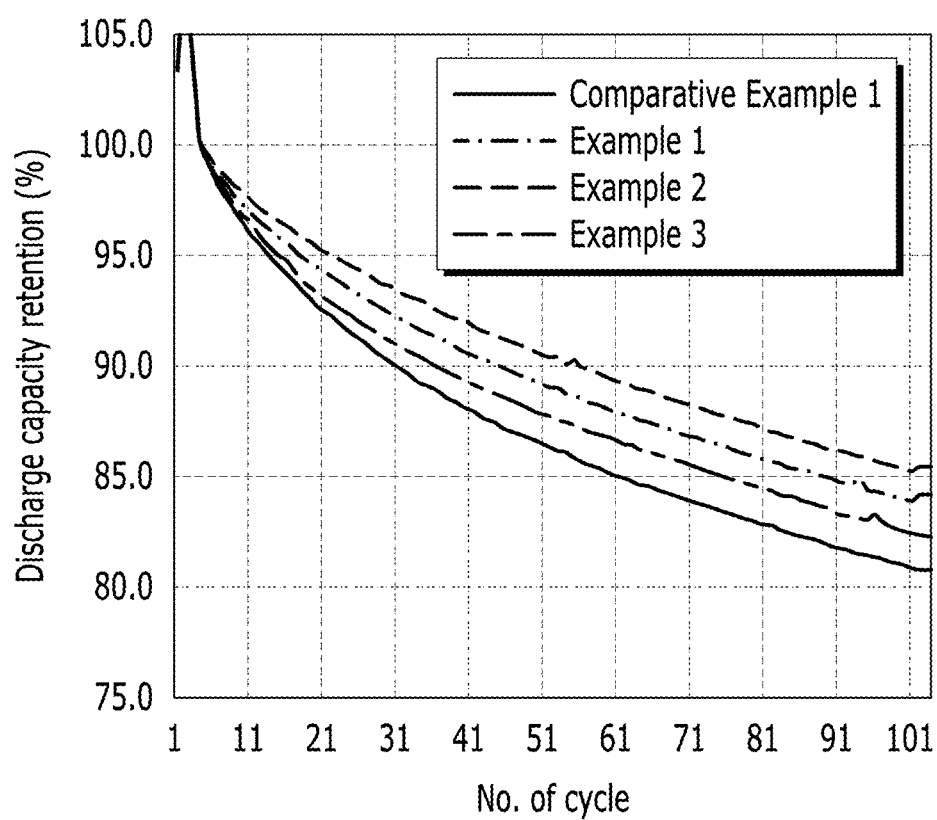
FIG. 5 shows cycle life characteristics of rechargeable lithium battery cells respectively including the negative electrodes according to Examples 1 to 3 and Comparative Example 1.

The rechargeable lithium battery cells respectively including the negative electrodes according to Examples 1 to 4 and Comparative Examples 1 and 2 were charged 100 times at a cut-off voltage of 4.4 V (0.02 C) in a CC-CV mode at a 0.7 C rate and then, discharged down to 3.0 V in a CC mode at a 0.5 C rate. The charge and discharge results of the cells according to Examples 1 to 3 and Comparative Example 1 are provided in FIG. 5. FIG. 5 shows cycle life characteristics of the rechargeable lithium battery cells respectively including the negative electrodes according to Examples 1 to 3 and Comparative Example 1. Referring to FIG. 5, the rechargeable lithium battery cells respectively including the negative electrodes according to Examples 1 to 3 showed excellent cycle life characteristics compared with the rechargeable lithium battery cell including the negative electrode according to Comparative Example 1.

While this disclosure has been described in connection with what is presently considered to be practical exemplary embodiments, it is to be understood that the invention is not limited to the disclosed embodiments and is intended to cover various modifications and equivalent arrangements included within the spirit and scope of the appended claims. In the present disclosure, the terms "Example," and "Comparative Example" are used to identify a particular example or experimentation and should not be interpreted as admission of prior art.

What is claimed is:

1. A negative electrode for a rechargeable lithium battery, comprising
an assembly of non-sheet-shaped graphite particles, at least one silicon-based particle in a region formed between the non-sheet-shaped graphite particles and at least one sheet-shaped graphite powder particle between the non-sheet-shaped graphite particles contacting at least one non-sheet-shaped graphite particle and at least one silicon-based particle,
wherein a size of the at least one silicon particle is smaller than a length of the longest axis of the at least one sheet-shaped graphite powder particle.

2. The negative electrode for a rechargeable lithium battery of claim 1, wherein the at least one non-sheet-shaped graphite particle comprises spherical graphite, pseudo-spherical graphite, or a mixture thereof.

3. The negative electrode for a rechargeable lithium battery of claim 1, wherein the at least one non-sheet-shaped graphite particle comprises about 10 wt % to about 40 wt % of natural graphite and about 60 wt % to about 90 wt % of artificial graphite.

4. The negative electrode for a rechargeable lithium battery of claim 1, wherein the at least one silicon-based particle is selected from Si, $SiO_x$ (0<x<2), a Si-M alloy (wherein, M is an alkali metal, an alkaline-earth metal, a Group 13 element, a Group 14 element, a Group 15 element, a Group 16 element, a transition metal, a rare earth element, or a combination thereof, and not Si), a composite of Si and carbon, and a combination thereof.

5. The negative electrode for a rechargeable lithium battery of claim 1, wherein the at least one non-sheet-shaped graphite particle has a particle size (D50) of about 10 μm to about 35 μm.

6. The negative electrode for a rechargeable lithium battery of claim 1, wherein the at least one silicon-based particle has a particle size (D50) of about 1 μm to about 5 μm.

7. The negative electrode for a rechargeable lithium battery of claim 1, wherein a ratio (A/B) of the length (A) of the longest axis of the sheet-shaped graphite powder and a particle size (B) of the at least one silicon-based particle is greater than about 1 and less than or equal to about 4.

8. The negative electrode for a rechargeable lithium battery of claim 1, wherein the sheet-shaped graphite powder has an average length of the longest axis of about 3 μm to about 7 μm.

9. The negative electrode for a rechargeable lithium battery of claim 1, wherein a thickness of the sheet-shaped graphite powder is greater than about 100 nm and less than or equal to about 900 nm.

10. The negative electrode for a rechargeable lithium battery of claim 1, wherein a ratio of (L/D) of a length (L) and a thickness (D) of the longest axis of the sheet-shaped graphite powder is about 4 to about 70.

11. The negative electrode for a rechargeable lithium battery of claim 1, wherein an amount of the at least one non-sheet-shaped graphite particle is about 50 wt % to about 90 wt % based on the total weight, 100 wt % of the negative active material layer.

12. The negative electrode for a rechargeable lithium battery of claim 1, wherein an amount of the at least one silicon-based particle may be about 5 wt % to about 50 wt % based on the total weight, 100 wt % of the negative active material layer.

13. The negative electrode for a rechargeable lithium battery of claim 1, wherein an amount of the sheet-shaped graphite powder is about 2 wt % to about 15 wt % based on the total weight, 100 wt % of the negative active material layer.

14. The negative electrode for a rechargeable lithium battery of claim 1, wherein the negative electrode further comprises an aqueous binder.

15. The negative electrode for a rechargeable lithium battery of claim 14, wherein the aqueous binder is a styrene-butadiene rubber (SBR), carboxylmethyl cellulose (CMC), an acrylonitrile-butadiene rubber, an acryl-based resin, a hydroxyethyl cellulose, or a combination thereof.

16. A rechargeable lithium battery comprising the negative electrode of claim 1, a positive electrode, and an electrolyte solution.

17. The rechargeable lithium battery of claim 16, wherein the at least one non-sheet-shaped graphite particle has a particle size (D50) of about 10 μm to about 35 μm.

18. The rechargeable lithium battery of claim 16, wherein the at least one silicon-based particle has a particle size (D50) of about 1 μm to about 5 μm.

19. The negative electrode for a rechargeable lithium battery of claim 16, wherein a ratio (A/B) of the length (A) of the longest axis of the sheet-shaped graphite powder and a particle size (B) of the at least one silicon-based particle is greater than about 1 and less than or equal to about 4.

20. A method of manufacturing a negative electrode for a rechargeable lithium battery, comprising
  adding at least one non-sheet-shaped graphite particle, at least one silicon-based particle, and a sheet-shaped graphite powder to an aqueous binder solution to prepare a composition, wherein a size of the at least one silicon particle is smaller than the length of the longest axis of the sheet-shaped graphite powder, and
  applying the composition on a current collector followed by drying and compressing the the composition applied on the current collector to manufacture a negative electrode.

* * * * *